C. E. DAYTON.
WIND ACTUATED DISPLAY DEVICE.
APPLICATION FILED APR. 13, 1910.
983,608.
Patented Feb. 7, 1911.
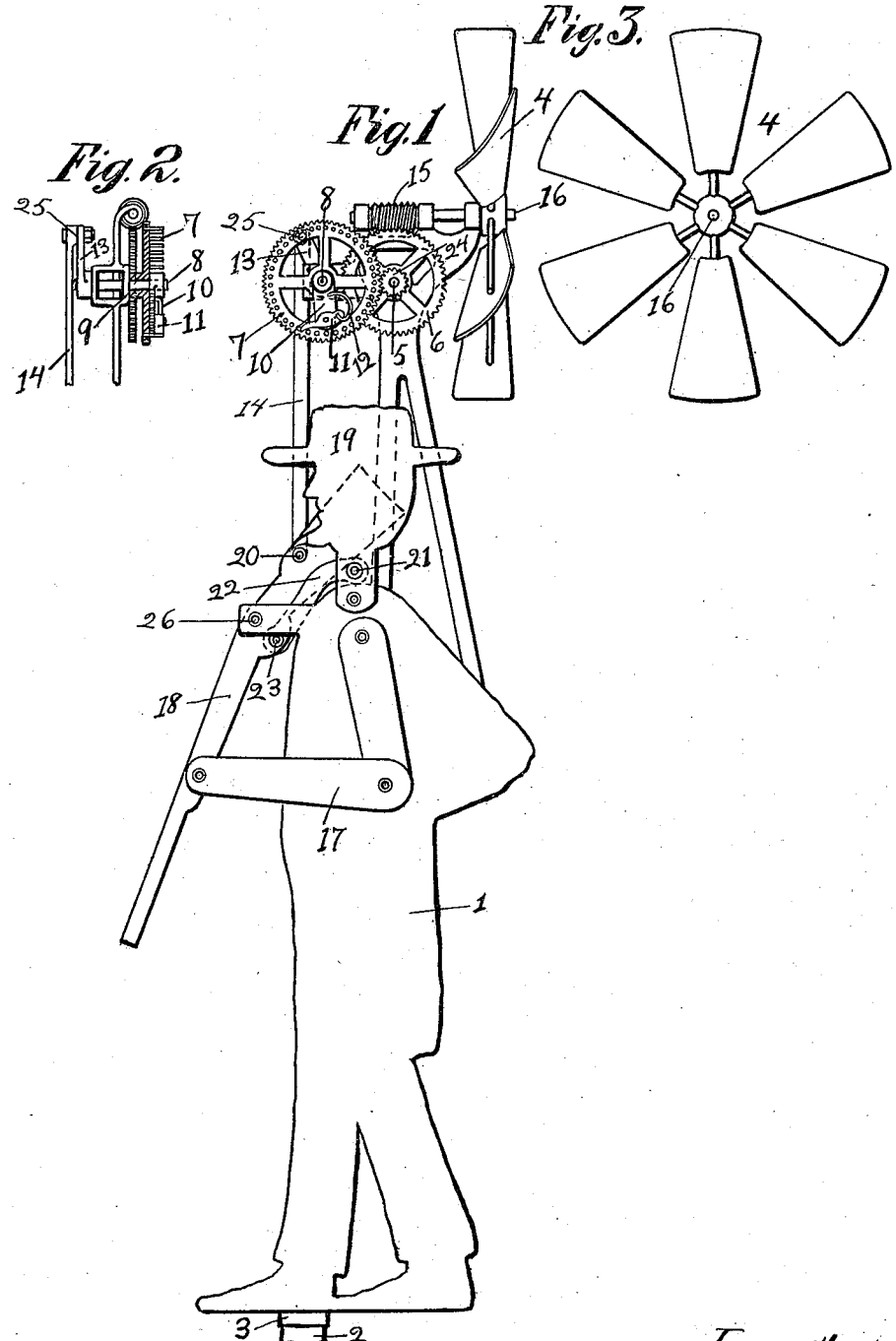
Witnesses:
F. H. Elliott
C. B. McGennell
Inventor.
Charles E. Dayton
by John H. Joy
his Attorney

UNITED STATES PATENT OFFICE.

CHARLES E. DAYTON, OF HARTFORD, CONNECTICUT.

WIND-ACTUATED DISPLAY DEVICE.

983,608.  Specification of Letters Patent.  Patented Feb. 7, 1911.

Application filed April 13, 1910. Serial No. 555,250.

*To all whom it may concern:*

Be it known that I, CHARLES E. DAYTON, a citizen of the United States, residing at Hartford, in the county of Hartford and State of Connecticut, have invented certain new and useful Improvements in Wind-Actuated Display Devices, of which the following is a specification.

This invention relates to wind actuated display devices and one simple form of embodiment thereof is shown in the accompanying drawings constituting part of the present specification wherein—

Figure 1 is a side elevation of the device, Fig. 2 is a front elevation of gear mechanism and certain coöperating parts, and, Fig. 3 is a face view of a wind wheel.

My invention relates to that class of machines employed to display signs for advertising or other purpose, and the action thereof may be either continuous or intermittent and advantageously the operation is effected through wind power. The device may be employed in other connections; for instance as a means for frightening away predatory birds or animals.

The appliance involves in its make-up an object or figure which may take any suitable form, the figure represented being denoted by 1 and being in the form of a manikin. The figure 1 which presents the body of the apparatus is preferably rotatable and is turned by wind power so that as will hereinafter appear, the wind wheel or analogous device may be the better maintained in the wind and to assure this result, the body or figure 1 is made flat or approximately so. As a suitable means for sustaining the figure or manikin 1 the shaft 2 may be provided, said shaft being represented as entering a sleeve 3 fastened to the base of the manikin, from which it will be clear that the sleeve turns on the shaft or spindle 2, the latter being generally rigidly fastened to some suitable support. From the observations made it will be clear that the figure or manikin turns after the fashion of a weather-vane. The wind wheel 4 is preferably arranged that its axis of motion is parallel with the plane of the figure or at right angles to the axis of motion of said figure, although there may be instances with other types of wind wheels where I should prefer to depart from this relation, but when a wind wheel such as that shown is employed, an advantage follows the disposition set forth in that the wind wheel continually faces the wind so as to constantly be actuated thereby.

The wind wheel 4 is fastened in some desirable manner to the shaft 16 which presents a suitable means for transferring power through a form of mechanism which I will hereinafter describe to certain moving parts. The shaft 16 has fastened rigidly thereto a worm 15 in mesh with the worm wheel 6, the shaft 5 of which, together with the shaft 16 is supported by suitable bearings upon a frame or structure rising from the manikin 1, from which it will be clear that the operating parts turn with said manikin. There is rotatively connected with the worm gear 6 the pinion 24 which is in mesh with peripheral teeth on the gear 7. The gear 7 is loosely mounted on the shaft 8, and it has lateral teeth engageable by the pawl 11, the engagement between the pawl and the said lateral teeth being normally maintained by the spring 12 acting against said pawl. Said pawl is pivoted to the crank arm 10 rigidly fastened to the outer or forward end of the shaft 8. There is a second crank arm 13 fastened to said shaft, the second crank arm being pivoted to the pitman 14 as shown at 25.

The figure or manikin 1 has a movable head 19 which I prefer to pivotally mount, and arms 17, the arms generally being made in the form of pivotally connected links one of which in each case is pivoted to the gun 18, while the other is pivoted to the manikin 1 at a point which corresponds approximately in the human figure to the shoulder joint. The gun back of its center of motion is pivoted at 20 to the rod or pitman 14 being preferably pivoted to a projection 26 extending from the manikin 1. There is also a link connection 22 pivoted at 21 to the head 19 and at 23 to the gun 18, the connection and pivots being so related that when the gun is elevated to firing position the head 19 through the described connection will be tipped forward and downward so as to simulate the sighting of a gun, the arms 17 naturally being raised owing to their connection with the gun.

Normally the point or tip of the pawl 11 is maintained in engagement with the lateral teeth of the gear 7, and this being so, it will be assumed that the gun 18 is in the position shown in Fig. 1 and that the wheel 4 is being turned by the wind so as to turn the lower part of the wheel 7 from the left toward the right. This being the case the crank arm 10 will be swung upward, the pawl 11 being carried therewith while at the same time the crank arm 13 will be swung downward, thereby forcing the rod or pitman 14 downward and bringing the gun 18 to a horizontal position at which point the crank arm 10 will have crossed the dead center line. As soon as the crank 10 crosses the dead center the gun 18 is permitted to drop from its horizontal to its inclined position shown in Fig. 1 and as it does drop the two cranks 13 and 10 are swung therewith, the motion in question being a rapid one whereby the spring actuated pawl 18 is drawn over the lateral teeth of the gear 7 and a decided, pronounced noise is made, this noise occurring contemporaneously with the falling of the gun.

The pawl and ratchet mechanism presents an audible alarm and from the statements made it will be clear that the machine comprises a figure having a movable member, which in the present case is the gun 18, an audible alarm associated with the figure, and means for causing the operation of said movable member and the audible alarm in desired order. I might also state that the falling of the gun also produces a noise which adds to the effect of said alarm.

What I claim is:

1. The combination of a manikin having a movable head and arms, a gun connected with the figure, wind actuated means for causing movements of the head, arms and gun to simulate the act of aiming, and an audible alarm also operable by said wind actuated means.

2. The combination of a manikin having a head and arms both movably connected therewith, a gun also movably connected with the manikin and with the arms, a connection between the gun and the head, and a wind operated wheel operatively connected with one of the movably mounted members.

3. The combination of a figure having a movable member associated therewith, a ratchet wheel, a wind operated wheel geared to the ratchet wheel for operating the latter, a pawl, and a carrier for the pawl, connected with said movable member, the ratchet wheel serving to operate the pawl and thereby said carrier to lift said movable member, said movable member on its descent being adapted to impart an opposite movement to the carrier to thereby drag said pawl along the teeth of said ratchet wheel.

4. The combination of a figure having a movable member, a ratchet wheel, a wind operated wheel geared to the ratchet wheel for operating the latter, a pawl coöperative with the ratchet wheel, a crank carrying the pawl and movable with respect to the ratchet wheel and operative connections between the crank and the said movable member.

In testimony whereof I affix my signature in presence of two witnesses.

CHARLES E. DAYTON.

Witnesses:
 JOHN W. JOY,
 GEO. B. THAYER.